United States Patent [19]

Hockman

[11] Patent Number: 5,062,521
[45] Date of Patent: Nov. 5, 1991

[54] ARTICLE ORIENTING APPARATUS

[75] Inventor: Edward N. Hockman, Auburn Hills, Mich.

[73] Assignee: Clyde Corporation, Rochester Hills, Mich.

[21] Appl. No.: 473,216

[22] Filed: Jan. 31, 1990

[51] Int. Cl.⁵ .............................................. B65G 47/24
[52] U.S. Cl. ...................................... 198/389; 198/396
[58] Field of Search ......................... 198/389, 396, 444

[56] References Cited

U.S. PATENT DOCUMENTS

| | | | |
|---|---|---|---|
| 3,346,095 | 10/1967 | Dixon | 198/389 |
| 3,367,015 | 2/1968 | Brossene, Jr. | 198/389 X |
| 3,447,707 | 6/1969 | Furst | 198/444 X |
| 3,474,890 | 10/1969 | Center | 198/389 |
| 3,567,007 | 3/1971 | Maeda | 198/389 |
| 3,907,099 | 9/1975 | Smith | 198/444 X |
| 4,006,812 | 2/1977 | Everett et al. | 198/396 X |
| 4,407,402 | 10/1983 | Nishimura et al. | 198/389 |
| 4,436,197 | 3/1984 | McDonald | 198/389 |
| 4,450,948 | 5/1984 | Naito et al. | 198/389 |
| 4,461,380 | 7/1984 | Grikis | 198/389 |

FOREIGN PATENT DOCUMENTS 0048536 3/1982 Japan .................................. 198/389

Primary Examiner—D. Glenn Dayoan
Attorney, Agent, or Firm—Barnes, Kisselle, Raisch, Choate, Whittemore & Hulbert

[57] ABSTRACT

Apparatus for orienting articles with a head and a shank such as bolts or screws with an inclined track on which articles are dumped adjacent its upper end by an elevator with a hopper. Some of the dumped articles fall off the track and are returned to the hopper by a chute while others remain on the track improperly oriented and some properly oriented with their heads bearing on rails of the track and their shanks depending between the rails. The improperly oriented articles are removed or kicked off the track by an overlying finger which is reciprocated generally longitudinally of the track. The properly oriented articles pass through a gate in the finger even when it is reciprocating and are accumulated on the track downstream of the finger. As needed, properly oriented articles are supplied from the lower end of the track to a feeder which propels them to a power screw driver or other driving device.

5 Claims, 2 Drawing Sheets

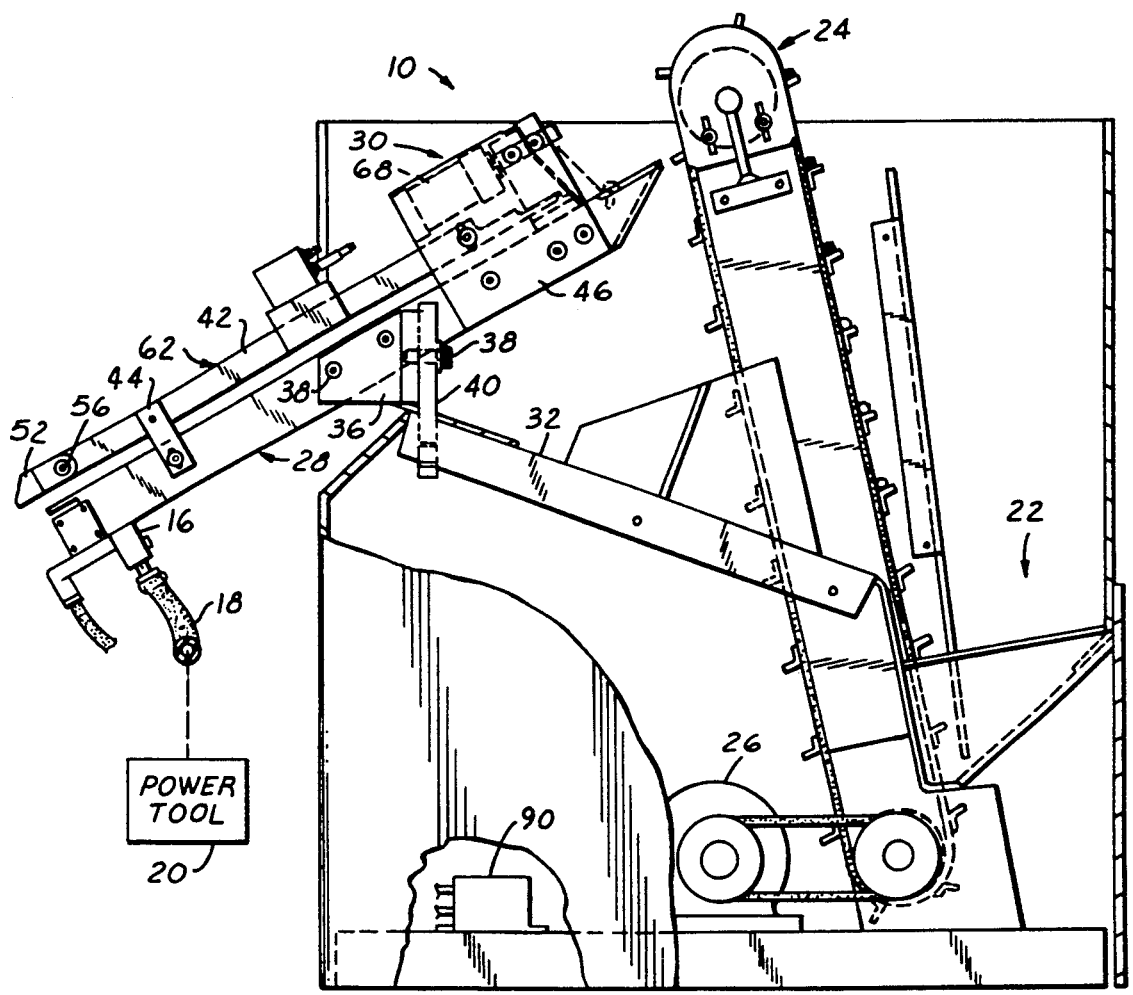
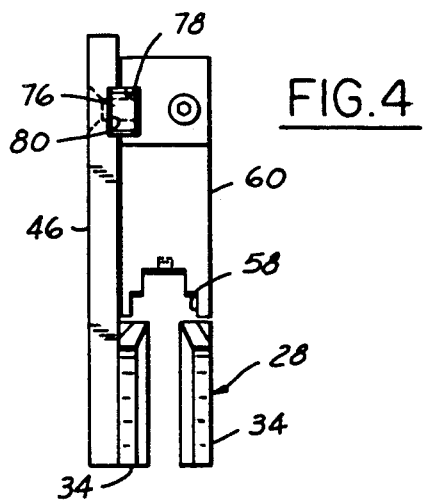
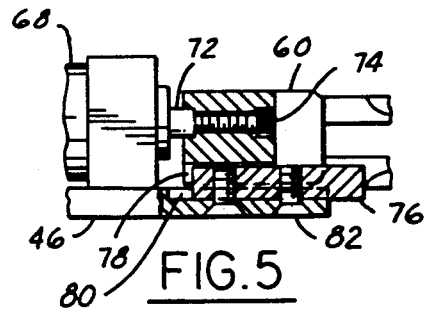
FIG. 1
FIG. 4
FIG. 5

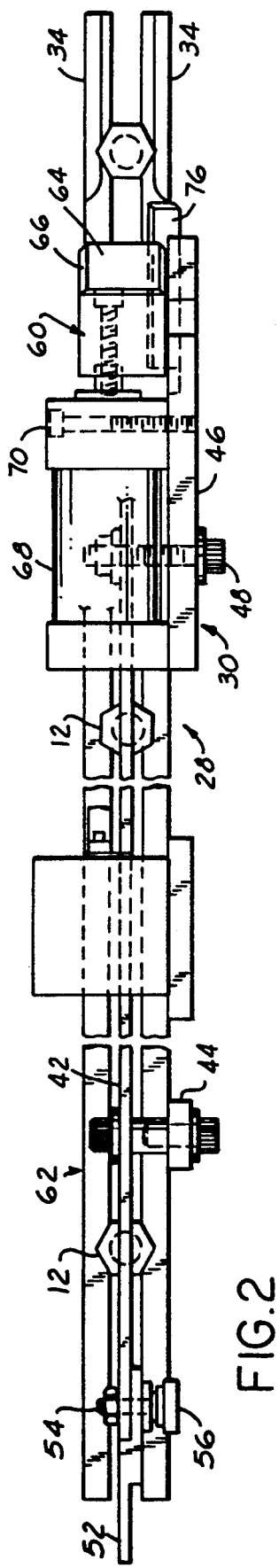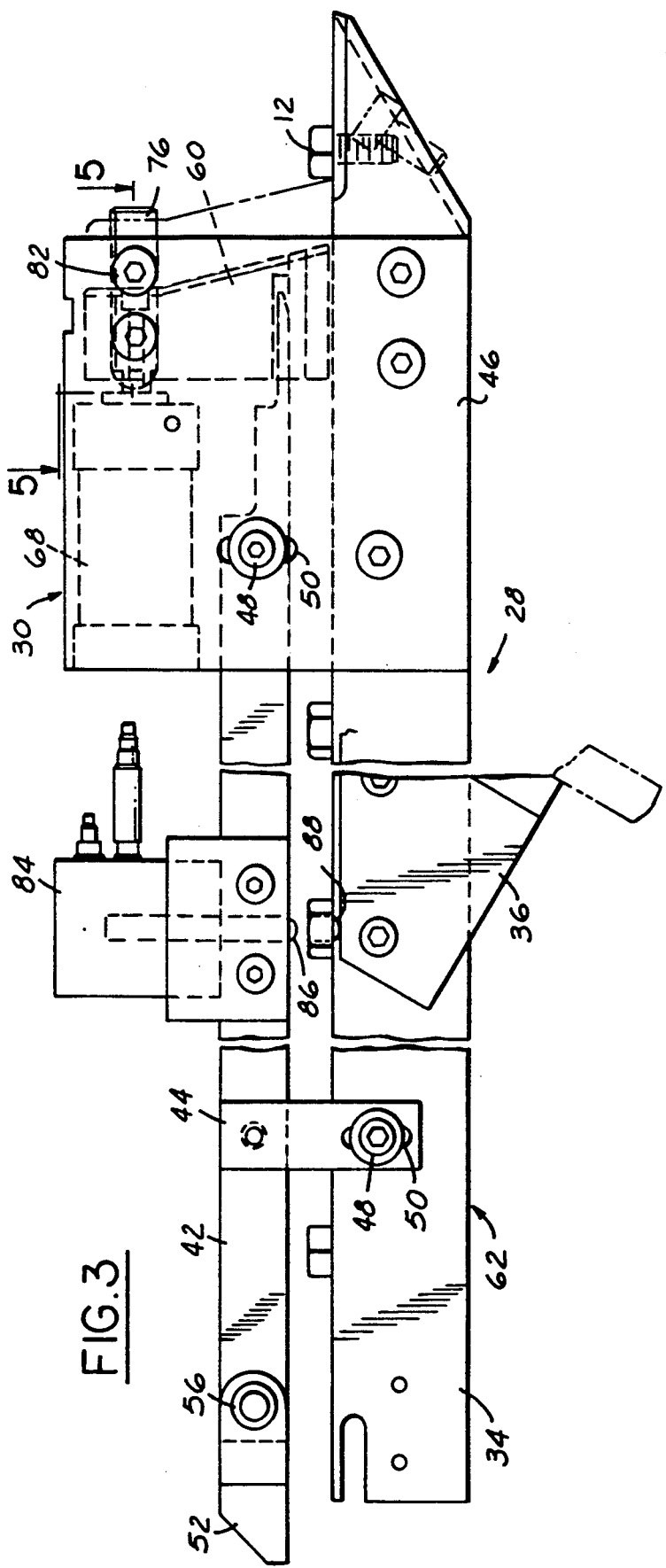

ARTICLE ORIENTING APPARATUS

FIELD OF THE INVENTION

This invention relates generally to article orienting and feeding apparatus and more particularly to an apparatus for orienting a plurality of like articles have a head and a shank, such as bolts, screws, other fasteners and the like.

BACKGROUND

In mass production and assembly operations using a power tool, such as a driver, for automatically driving articles having a head and a shank, such as bolts and screws, it is necessary to rapidly supply to the power driver, one article at a time in a predetermined orientation. Usually, although not necessarily, the articles are oriented in generally parallel side-by-side relationship with the heads of adjacent articles abutting each other and their shanks depending in generally parallel relationship. Because they have so many edges, such articles are highly susceptible to becoming caught, hung up, jammed or misaligned and, hence, it is extremely difficult to rapidly and automatically correctly orient and feed such articles to provide an uninterrupted succession of articles with the same desired orientation.

Moreover, the difficulty of properly orienting and feeding these articles is greatly increased whenever the distribution of their mass is such that their centers of gravity or balance along the longitudinal axis lies within or immediately adjacent the head rather than along the shank of the articles. Such articles are in effect head heavy or top heavy and hence very unstable and have an increased tendency to jam, hang up or come to rest on their head with their shank projecting generally upwardly. Usually, top heavy articles have a relatively short shank.

While many devices have been devised for rapidly orienting and feeding such articles, most have proved to be unsatisfactory. However, one device which has been satisfactory for most applications and commercially successful is disclosed and claimed in U.S. Pat. No. 4,436,197. To properly orient articles supplied by an elevator from a hopper, this device utilizes an article gate associated with a pivoted track section which is periodically moved, to dump or remove by gravity improperly oriented articles from the track.

While this device is generally satisfactory it is rather complex, has a limited maximum rate at which it can produce properly oriented articles, and experiences some difficulty in orienting head heavy articles which further limits its maximum rate of producing properly oriented head heavy articles.

SUMMARY OF THE INVENTION

Articles, such as bolts, to be oriented are dumped a few at a time, preferably by an elevator, onto a track having a pair of spaced apart rails which slope downwardly so that the bolts can slide along the track toward its lower end. As the bolts are dumped, some fall off the track, others assume a desired orientation on the track with their heads bearing on the rails and their shank extending between the rails, and the remainder are received on the track in other orientations. Downstream from the point at which articles are dumped on the track a kicker finger with a gate permits only articles in the desired orientation to move along the track downstream of the gate and prevents articles with any other orientation from passing downstream of the gate. To remove misoriented articles from the track, the finger is intermittently moved or reciprocated to knock off or remove misoriented articles from the track. Preferably, the articles which drop from the track are returned to the elevator which again dumps the articles onto the track.

Objects, features and advantages of this invention are to provide an article orienting apparatus which is of greatly simplified design, has few moving parts, significantly decreases the likelihood of articles becoming hung up or jammed in the device, properly orients head heavy articles, has a significantly increased maximum rate of producing properly oriented articles, is substantially less expensive to manufacture and assemble, is readily and easily adapted to orienting different size articles, requires relatively little maintenance and repair, and has significantly improved durability, reliability, and performance and significantly increased useful life in mass production and assembly operations.

BRIEF DESCRIPTION OF THE DRAWINGS

These and other objects, features and advantages of the invention will be apparent from the following detailed description, appended claims and accompanying drawings in which FIG. 1 is a side view with portions broken away of an article orienting apparatus embodying this invention associated with a feed device and a power tool;

FIG. 2 is a fragmentary top view of the orienting apparatus of FIG. 1;

FIG. 3 is a fragmentary side view of the orienting apparatus of FIG. 1;

FIG. 4 is an end view of a track and kicker of the orienting apparatus of FIG. 1; and FIG. 5 is a fragementary sectional view taken generally on line 5—5 of FIG. 3.

DETAILED DESCRIPTION OF THE PREFERRED EMBODIMENT

Referring in more detail to the drawings, FIG. 1 illustrates an article orienting apparatus 10 embodying this invention which supplies oriented articles, such as bolts 12, to a pneumatic device 16 which feeds the bolts one at a time through a flexible hose 18 to a power tool 20, such as a pneumatic driver. The feed device 16 may be of conventional design, but preferably is the feed device disclosed and claimed in U.S. Pat. No. 4,363,573, the disclosure of which is incorporated herein by reference and hence the feed device will not be described in further detail.

The bolts 12 to be oriented are initially received in a hopper 22 from which they are picked up a few at a time by an elevator 24 driven by an electric motor 26 and dumped onto the upper end of a track assembly 28. Properly oriented bolts are permitted to slide down the track through a gate in a kicker assembly 30 which removes improperly oriented bolts from the track. Bolts which drop or are removed from the track are returned to the hopper by a slide or chute 32. The elevator and hopper construction and operation are fully described in U.S. Pat. No. 4,436,197, the disclosure of which is incorporated herein by reference and hence will not be described in further detail.

As shown in FIGS. 2 and 3, properly oriented bolts 12 are received in the track assembly with their heads bearing on a pair of parallel rails 34 with their shanks extending between the rails. The rails are mounted in laterally spaced apart relationship by a pair of brackets 36 each secured by cap screws 38 to one rail and a mounting plate 40 fixed to the hopper housing. To accommodate a wide range of bolt shank diameters, preferably the lateral spacing between the rails is adjustable. To prevent the bolts from overriding one another, their vertically upward movement is limited by an overlying retainer bar 42 secured adjacent its lower end to a bracket 44 and adjacent its upper end to a mounting plate 46. To accommodate a wide range of bolt head heights or thicknesses, the vertical spacing between the bottom edge of the retainer bar and the upper edge of the track can be varied and adjusted. This is accomplished by cap screws 48 extending through elongate slots 50 in the bracket and mounting plate and threaded into the retainer bar which can be loosened to adjust the spacing and tightened to secure the retainer in adjusted position.

To facilitate clearing or removing any jammed bolt, preferably the lower end of the retainer has an extension portion 52 pivotally mounted and adjustably secured thereon by a nut and bolt 54 with a knob 56 thereon.

In accordance with this invention, when bolts are dumped by the elevator onto the upper end of the track assembly, some of the bolts fall off of the track, some remain on the track with an improper orientation and some assume the desired orientation with their heads bearing on the rails and their shanks depending between the rails. The properly oriented bolts slide by gravity down the track and their heads pass through a slot or gate 58 in a finger 60 of the kicker assembly 30 and into the downstream accumulator portion 62 of the track.

Preferably, to facilitate removal of improperly oriented bolts from the upper end of the track, the finger has an inclined front face 64 and beveled side edges 66. To remove improperly oriented bolts from the upper end of the track, the finger 60 is reciprocated by a ram or pneumatic cylinder 68 secured by cap screws 70 to the mounting plate 46. The finger is removably connected to the cylinder piston rod 72 by a cap screw 74. The finger is slidably received for reciprocation on a way or guide bar 76 removably received in a slot 78 through the finger and secured in a recess 80 in the mounting plate by bolts 82. Preferably, the guide bar 76 also spaces the finger at least slightly from the mounting plate so they do not bear on one another and hence become worn in use as the finger is reciprocated.

Preferably, the finger is reciprocated at a rate of about 40 to 80 and preferably 55 to 65 cycles per minute. Usually the rate at which the finger is reciprocated depends on both the rate at which properly oriented bolts are supplied to the feeder device 16 and the particular bolts being supplied.

In most operations, the apparatus 10 will produce properly oriented bolts at a higher rate than that required by the feeder device 16 and power tool 20. Therefore, usually the orienting apparatus 10 is turned on and off so that it operates only intermittently to meet the demand of the feeder device. When additional bolts should be provided to the accumulator portion 62 of the track is determined by a sensor 84 with a movable probe 86 which is periodically pneumatically advanced and retracted. If there is a sufficient supply of bolts in the accumulator, as the probe is advanced it will bear on an underlying bolt head as shown in FIG. 3 and the apparatus 10 will remain turned off or deenergized. However, if there are insufficient bolts in the accumulator, when the probe is advanced, it will not contact a bolt and will be extended to the position 88 shown in phantom line in FIG. 3. This will cause the sensor through appropriate circuitry and an electropneumatic control valve 90 to initiate cycling of the cylinder 68 to reciprocate the finger and operation of the drive motor 26 of the elevator 24 to supply additional properly oriented bolts to the accumulator portion of the track. When the accumulator is again full the probe of the sensor will bear on another bolt and through appropriate circuitry deenergize or turn off the orienting apparatus.

In use, the apparatus 10 is normally turned on and off by the sensor 84 to supply properly oriented bolts to the accumulator portion 62 of the track as needed. When the apparatus is turned on, the elevator is driven to raise bolts from the hopper and dump them on the upper end of the track assembly. Those bolts which drop onto the track in a proper orientation pass through the gate 58 in the finger 60 of the kicker assembly 30 and down the track into its accumulator portion 62 even as the finger is being reciprocated. To remove improperly oriented bolts received on the upper end of the track assembly, the finger 60 is reciprocated by its drive cylinder 68 so that it will knock off or remove improperly oriented bolts from the track. This removal of improperly oriented bolts permits succeeding properly oriented bolts to slide down the track through the gate 58 in the finger 60 and into the accumulator portion 62 of the track. The orienting apparatus is turned off by the sensor 84 and associated control circuitry when a sufficient number of bolts are received in the accumulator portion of the track so that the head of a bolt underlies and is contacted by the sensor probe 86 when it is periodically advanced. Typically, the control circuitry provides a short time delay between the sensor determining the presence of a bolt and the orientating apparatus being shut off so that usually several properly oriented bolts are received in the accumulator portion upstream of the sensor. This results in several bolts being received by the feeder from the accumulator portion before the orienting device is again energized by the sensor.

I claim:

1. An apparatus for orienting articles each having a head and a shank comprising, a track having a pair of generally parallel and laterally spaced apart rails constructed and arranged to receive a head of an article thereon with at least a portion of the shank thereof depending therebetween, said track sloping downwardly such that articles received thereon slide toward the lower end thereof, a movable finger overlying said track, disposed between the ends thereof and having a gate opening therethrough adjacent said track which is constructed and arranged to permit only articles properly oriented on said track with their heads on said rails and their shanks depending therebetween to pass through said finger from a location on said rack upstream of said finger to a location downstream thereof, said finger also being constructed and arranged to prevent articles received on said track in any other orientation from moving downstream thereof and having means thereon to remove improperly oriented articles on said track therefrom when said finger is reciprocated longitudinally of said track, a mounting plate carried by said track, a way secured to said mounting plate and constructed and arranged to slidably receive said finger thereon for reciprocation generally longitudinally of said track and to prevent rotation thereof, a drive operably connected with said finger for moving said finger relative to said track to engage and remove improperly oriented articles therefrom while permitting properly oriented articles to pass through the gate thereof, said drive comprising a ram carried by said mounting plate, having a piston rod releasably connected to said finger, and constructed and arranged to reciprocate said finger on said way generally longitudinally of said track, and article delivery means associated with said track and constructed and arranged to periodically dump articles onto said track from a location above and spaced from said track and upstream of said finger, whereby articles dumped by said delivery means fall by gravity onto said track and which are oriented with their heads received on said rails and their shanks depending therebetween will move along said track through said gate of said finger and downstream thereof and articles from said delivery means remaining on said track in any other orientation will be removed from said track by movement of said finger and prevented from moving on said track downstream of said finger such that only articles with their heads bearing on said rail and having their shanks depending therebetween are received on said track downstream of said finger.

2. The apparatus of claim 1 wherein said mounting plate has a recess in which said way is removably received.

3. The apparatus of claim 1 wherein said mounting plate is removably secured to said track.

4. An apparatus for orienting articles each having a head and a shank comprising, a track having a pair of generally parallel and laterally spaced apart rails constructed and arranged to receive a head of an article thereon with at least a portion of the shank thereof depending therebetween, said track sloping downwardly such that articles received thereon slide toward the lower end thereof, a movable finger overlying said track, disposed between the ends thereof and having a gate opening therethrough adjacent said rack which is constructed and arranged to permit only articles properly oriented on said track with their heads on said rails and their shanks depending therebetween to pass through said finger rom a location on said track upstream of said finger to a location downstream thereof, said finger also being constructed and arranged to prevent articles received on said track in any other orientation from moving downstream thereof and having means thereon to remove improperly oriented articles on said track therefrom when said finger is reciprocated longitudinally of said track, a guide fixed with respect to said track and constructed and arranged to slidably receive said finger for reciprocation generally longitudinally of said track, a drive operably connected with said finger for moving said finger relative to said track to engage and remove improperly oriented to pass therefrom while permitting properly oriented articles to pass through the gate thereof, said drive being operatively connected to said finger and constructed and arranged to reciprocate said finger on said guide generally longitudinally of said track, and article delivery means associated with said track and constructed and arranged to periodically dump articles onto said track from a location above and spaced from said track and upstream of said finger, whereby articles dumped by said delivery means fall by gravity onto said track and which are oriented with their heads received on said rails and their shanks depending therebetween will move along said track through said gate of said finger and downstream thereof and articles from said delivery means remaining on said track in any other orientation will be removed from said track by movement of said finger and prevented from moving on said track downstream of said finger such that only articles with their heads bearing on said rail and having their shanks depending therebetween are received on said track downstream of said finger.

5. The apparatus of claim 4 which also comprises an article sensor located adjacent said track downstream of said finger and constructed and arranged to detect the presence or absence of an article on said track proximate said sensor, and control means for said drive and said article delivery means, said control means being operably connected with said sensor, drive and article delivery means and constructed and arranged to energize said drive and said article delivery means when said sensor does not detect an article on said track proximate thereto and to de-energize said drive an article delivery means when said sensor detects an article on said track proximate thereto.

* * * * *